(12) United States Patent
Fujihara

(10) Patent No.: US 7,331,414 B2
(45) Date of Patent: Feb. 19, 2008

(54) PROTECTIVE STRUCTURE FOR AN ELECTRICAL CIRCUIT DEVICE

(75) Inventor: Koichi Fujihara, Kariya (JP)

(73) Assignee: Denso Corporation, Kariya (JP)

( * ) Notice: Subject to any disclaimer, the term of this patent is extended or adjusted under 35 U.S.C. 154(b) by 373 days.

(21) Appl. No.: 10/996,465

(22) Filed: Nov. 26, 2004

(65) Prior Publication Data

US 2005/0115756 A1  Jun. 2, 2005

(30) Foreign Application Priority Data

Dec. 1, 2003  (JP) .............................. 2003-401962

(51) Int. Cl.
*B60K 28/014* (2006.01)

(52) U.S. Cl. ..................... 180/271; 180/274; 340/436; 73/493

(58) Field of Classification Search ................ 280/784, 280/727, 783, 748; 296/187.03; 73/493; 180/274, 271; 340/436
See application file for complete search history.

(56) References Cited

U.S. PATENT DOCUMENTS

| 3,307,054 | A | * | 2/1967 | Shoor ......................... 310/329 |
| 4,399,705 | A | * | 8/1983 | Weiger et al. ................ 73/654 |
| 4,949,571 | A | * | 8/1990 | Komurasaki ............. 73/514.16 |
| 4,966,031 | A | * | 10/1990 | Mochizuki ................. 73/35.11 |
| 4,967,114 | A | * | 10/1990 | Komurasaki et al. ........ 310/329 |
| 5,080,188 | A |   | 1/1992 | Okuhara et al. |
| 5,125,263 | A | * | 6/1992 | Komurasaki et al. ...... 73/35.11 |
| 5,144,837 | A | * | 9/1992 | Komurasaki et al. ...... 73/35.11 |
| 5,150,606 | A | * | 9/1992 | Komurasaki ............... 73/35.09 |
| 5,398,540 | A | * | 3/1995 | Entenmann et al. ....... 73/35.11 |
| 5,440,933 | A | * | 8/1995 | Brammer et al. ............. 73/756 |
| 5,739,418 | A | * | 4/1998 | Hackel et al. ............. 73/35.11 |
| 5,939,616 | A | * | 8/1999 | Ito et al. .................... 73/35.11 |
| 5,987,921 | A | * | 11/1999 | Ueyanagi ....................... 65/40 |
| 6,279,381 | B1 | * | 8/2001 | Brammer et al. .......... 73/35.11 |
| 6,309,132 | B1 | * | 10/2001 | Jakob et al. ................. 403/200 |
| 6,460,648 | B2 | * | 10/2002 | Kleinberg .................... 180/282 |
| 6,676,156 | B2 | * | 1/2004 | Suzuki et al. ............... 280/735 |
| 6,752,005 | B2 | * | 6/2004 | Harada et al. ............. 73/35.13 |
| 6,776,026 | B1 | * | 8/2004 | Barron ....................... 73/35.11 |
| 6,786,078 | B2 | * | 9/2004 | Brammer ................... 73/35.11 |
| 6,923,041 | B2 | * | 8/2005 | Harada et al. ............. 73/35.07 |
| 6,986,277 | B2 | * | 1/2006 | Yokoi ........................ 73/35.11 |
| 7,116,215 | B2 | * | 10/2006 | Oonishi ....................... 340/436 |
| 2002/0088662 | A1 |   | 7/2002 | Kleinberg |
| 2003/0062207 | A1 |   | 4/2003 | Suzuki et al. |

FOREIGN PATENT DOCUMENTS

| EP | 0 540 071 A1 | 5/1993 |
| JP | 05 112195 A | 5/1993 |
| JP | 05 330399 A | 12/1993 |

* cited by examiner

*Primary Examiner*—Paul N. Dickson
*Assistant Examiner*—Timothy Wilhelm
(74) *Attorney, Agent, or Firm*—Oliff & Berridge, PLC

(57) ABSTRACT

A protective structure for an electrical circuit device attached to a vehicle includes a resin case, an electrical circuit, and a rigid body. The electrical circuit is contained in the resin case. The rigid body is contained in the resin case. The rigid body protrudes toward a collision-prone side of the vehicle beyond the resin case. The rigid body deforms or displaces to absorb collision energy when the vehicle is involved in a collision on the collision-prone side.

17 Claims, 2 Drawing Sheets

FRONT OF VEHICLE →

DESIGNATED SURFACE OF ATTACHMENT

FRONT OF VEHICLE →

FRONT OF VEHICLE →

DESIGNATED SURFACE OF ATTACHMENT

PROTECTIVE STRUCTURE FOR AN ELECTRICAL CIRCUIT DEVICE

CROSS REFERENCE TO RELATED APPLICATIONS

This application is based upon and claims the benefit of priority of Japanese Patent Application No. 2003-401962, filed on Dec. 1, 2003, the contents of which are incorporated herein by reference.

FIELD OF THE INVENTION

The present invention relates to a structure that protects an electrical circuit on a vehicle from damage during a collision.

BACKGROUND OF THE INVENTION

Conventional vehicles are equipped with various kinds of electrical circuit devices with sensors implemented on them. One example of this type of device is a collision detection electrical circuit device having a G-sensor (acceleration sensor) for detecting collisions and vibrations in anticipation of inflating an airbag mounted in the passenger compartment of the vehicle. FIG. 5 depicts a conventional collision detection electrical circuit device 101 including a circuit unit 102 having a G-sensor, a metal bushing 103, a resin case 104, and a bolt 105. The metal bushing 103 helps fasten the resin case 104 to a designated surface of the vehicle body. The resin case 104 unifies the structure of the circuit unit 102 and the bushing 103. The bolt 105 attaches the device 101 to the vehicle body. The electrical circuit device 101 is fastened onto the designated surface of the vehicle via the bolt 105. A threaded portion 105a of the bolt 105 enters a bolt-hole 103a of the bushing 103, which is laid in the resin case 104. A signal wire (not shown) electrically connects the electrical circuit device 101 to an airbag control device. The signal wire transfers a G-detection signal from the G-sensor to the airbag control device. Furthermore, the conventional structure includes a steel protection plate or collision guard in front of the electrical circuit device 101 on a collision-prone side or front side of the vehicle. The collision guard protects the electrical circuit device 101 from dislocation upon impact of collision and/or to protect the resin case 104 from malfunctioning due to the impact of collision.

In the conventional structure of the collision protection device described above, it is necessary to have a space for the standing steel plate to attach to the designated surface of the vehicle. Providing for such space poses restrictions on the flexibility of positioning and installing the electrical circuit device 101.

SUMMARY OF THE INVENTION

The present invention provides a collision protection structure that protects an electrical circuit device during a collision and having a high degree of installation flexibility.

Each of the embodiments for solving the problem will be described with reference to the effect and effectiveness as required hereinafter.

The collision protection structure of the present invention has its advantage in its unified structure of its resin case and collision protection rigid body that houses the electrical circuit device.

Therefore, the resin case is protected from breaking because it and the rigid body are unified. Thus, the rigid body is capable of deforming to absorb energy during a collision. Furthermore, the collision protection structure of the present invention eliminates the requirement of a collision protector plate, thereby increasing installation flexibility and reducing production cost. Further yet, protecting the resin case from breakage prevents the electrical circuit device from having fastening and functional problems.

One aspect of the electrical circuit device of the present invention includes a rigid body for collision protection. The rigid body is made of a bushing for fastening a bolt laid in a resin case, wherein at least a portion of the bushing protrudes from the resin case toward a collision-prone side or front side of the vehicle.

Therefore, because the bushing for fastening the bolt laid in the resin case serves as the protective body, the requirement of a collision protector plate being fastened to the designated surface of the vehicle is eliminated. Furthermore, because at least a portion of the bushing protrudes from the resin case toward the collision-prone side of the vehicle, the bushing deforms to absorb the impact during a collision to securely protect the resin case from breaking.

Another aspect of the electrical circuit device of the present invention includes the collision protection rigid body having at least an arc shaped or polygonal shaped cross-section or profile facing the collision-prone side of the vehicle.

Therefore, the arc shape or polygonal shape disperses collision energy to the other portions of the collision protection structure and away from the electrical circuit device to effectively prevent the resin case from breaking.

Another embodiment of the collision protection structure of the present invention includes the electrical circuit contained in the resin case, the bolt fixing the resin case to a stationary object, and at least a portion of a head-seating portion of the bolt protruding from the resin case toward the collision-prone side of the vehicle.

Therefore, because at least a portion of the head-seating portion of the bolt protrudes from the resin case toward the collision-prone side, the head-seating portion of the bolt is deformable to absorb the impact during collision to securely protect the resin case from breaking. Furthermore, because the bolt serves as the rigid body to protect the resin case, the requirement of attaching a collision protection plate to the designated surface is eliminated. This results in a greater degree of freedom for mounting the electrical circuit device and further reduces the cost of production. Moreover, protecting the resin case from breaking prevents the electrical circuit device from having fastening and functional problems.

Another embodiment of the collision protection structure of the present invention includes the electrical circuit contained in the resin case, the bolt fixing the resin case to a stationary object, and a washer tightened between a head-seating portion of the bolt and the resin case. At least portion of the washer protrudes toward the collision-prone side of the vehicle from the resin case.

Therefore, because at least a portion of the washer protrudes toward the collision-prone side of the vehicle, the washer is able to deform or dislocate from its original position to absorb the impact of a collision and to securely protect the resin case from breaking. Furthermore, because the washer serves as the rigid body protecting the resin case, the need for a collision protection plate attached to the designated surface is eliminated. This results in a greater degree of freedom in mounting the electrical circuit device and a reduction in the cost of production. Moreover, protecting the resin case from breakage prevents the electrical circuit device from having fastening and functional problems.

It should be appreciated that the collision protection structure described above can be preferably applied to an electrical circuit device such as an onboard sensor device for collision detection.

Furthermore, it should be appreciated that the collision protection structure of the present invention securely protects the resin case from breaking by absorbing collision energy during a collision. In addition, a greater degree of freedom in mounting the electrical circuit device can be achieved and the production cost can be reduced because there is no need to attach a collision protection plate to the designated surface of the vehicle.

Other features and advantages of the present invention will be appreciated, as well as methods of operation and the function of the related parts from a study of the following detailed description, appended claims, and drawings, all of which form a part of this application. In the drawings:

DETAILED DESCRIPTION OF THE PREFERRED EMBODIMENTS

Each of the preferred embodiments will now be described with reference to the drawings.

Figure 1:
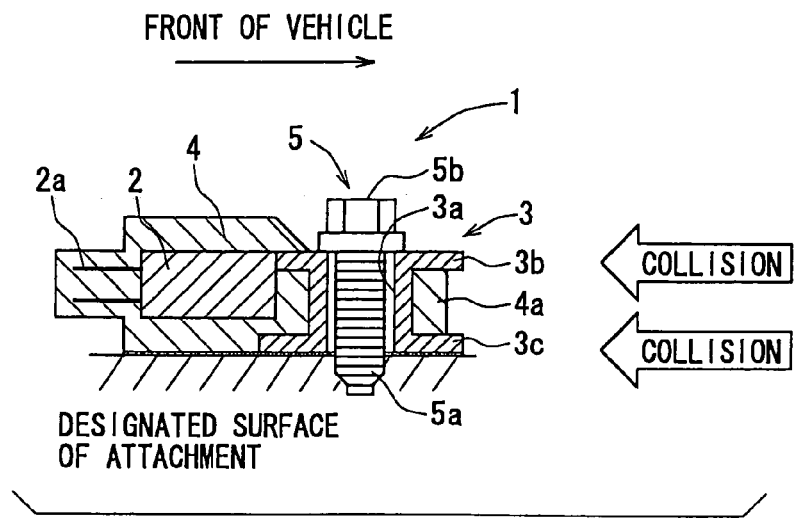
FIG. 1 is a cross-sectional side view of an electrical circuit device according to a first embodiment of the present invention.
Figure 2:
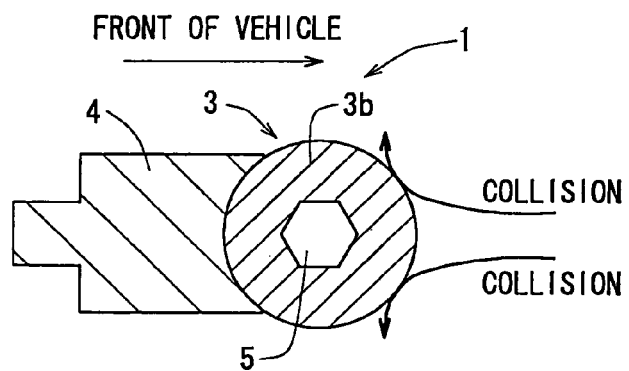
FIG. 2 is a top view of the electrical circuit device of FIG. 1.

The electrical circuit device 1 of the first embodiment of the present invention is described with reference to FIGS. 1 and 2. The electrical circuit device 1 is a collision-detection sensor that is mounted on a front portion of a vehicle and is operable to transfer a G-detection signal indicating the occurrence of a collision and/or vibrations to an airbag control device.

The electrical circuit device 1 includes a circuit unit 2, a bushing 3, a resin case 4, and a bolt 5. The bolt 5 includes a threaded portion 5a and a head-seating portion 5b. In this embodiment, the circuit unit 2 corresponds to the electrical circuit device of the present invention and the bushing 3 corresponds to the collision protection member of the present invention.

The circuit unit 2 includes a G-sensor (not shown) and a P-plate. The G-sensor is mounted on the circuit unit 2 for detecting collisions and vibrations. The P-plate, which is a glass-epoxy substrate, has an electrical circuit for outputting the G-detection signal. The circuit unit 2 has a pin-shaped connector terminal 2a. A signal wire (not shown) establishes an electrical connection between the connector terminal 2a of the circuit unit 2 and the airbag control unit.

The bushing 3 is a rigid metal cylinder having a through-hole 3a to accommodate the bolt 5. The bushing 3 includes upper and lower surfaces having flange portions 3b, 3c that protrude in a radial direction.

The resin case 4 has a unified structure around the circuit unit 2 and the bushing 3. The resin case 4 is made of a resin material such as a PBT (poly-butylene terephthalate) resin, a nylon resin, or any other resin capable of serving the principles of the present invention. When mounted to a vehicle, the circuit unit 2 is positioned toward the rear of vehicle relative to the bushing 3. The flange portions 3b, 3c of the bushing 3 protrude toward the front side of the vehicle beyond a front surface 4a of the resin case 4. Therefore, because collisions are expected to occur on the front side of the vehicle according to the electrical circuit device 1, the flange portions 3b, 3c of the bushing 3 protrude toward a collision-prone side of the vehicle to serve as a collision protection rigid body.

The effect of the structure of the above-described electrical circuit device 1 during a collision is now described. As stated above, the electrical circuit device 1 is fixed to a designated surface of a vehicle by fastening the threaded portion 5a of the bolt 5 through the through-hole 3a of the bushing 3. Because the flange portions 3b, 3c of the bushing 3, which are disposed on the front side of the electrical circuit device 1, protrude toward the front of the vehicle beyond the front surface 4a of the resin case 4, the energy of a body colliding with the electrical circuit device 1 from the front of the vehicle is absorbed by deformation of the flange portions 3b, 3c of the bushing 3. This protects the resin case 4 from breaking. Furthermore, as shown in FIG. 2, the bushing 3 includes a round cross-sectional shape or profile that serves to disperse the collision energy towards the outer sides of the electrical circuit device 1, thereby effectively preventing the resin case 4 from breaking during a collision.

In this embodiment, the resin case 4 is securely protected from breaking during a collision because the bushing 3 serves as a collision protection device and is unified into the resin case 4. Furthermore, deformation of the flange portions 3b, 3c of the bushing 3 absorb the energy of the collision. In addition, because the bushing 3 serves as the collision protection rigid body, the need for a collision protection plate mounted on the designated surface is eliminated. This results in a greater degree of freedom for mounting the electrical circuit device and reduces the cost of production. Moreover, protecting the resin case from breaking also prevents the electrical circuit device from having fastening and/or functional problems.

Figure 3:
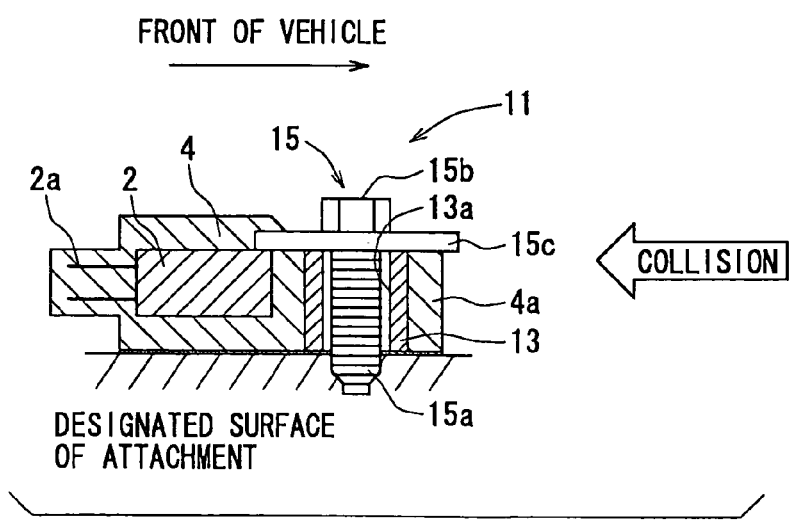
FIG. 3 is a cross-sectional side view of an electrical circuit device according to a second embodiment of the present invention.

Next, an electrical circuit device 11 according to a second embodiment of the present invention is described with reference to FIG. 3. The electrical circuit device 11 in this embodiment includes a bolt 15 having a head-seating portion 15c that is enlarged in the radial direction. That is, the bolt 15 includes a threaded portion 15a, a head portion 15b, and a head-seating portion 15c. The head-seating portion 15c includes an enlarged diameter compared to the head portion 15b. In this embodiment, a cylindrical bushing 13 with a through-hole 13a for receiving the threaded portion 15a of the bolt 15 is used instead of the bushing 3. The bushing 13 of this embodiment does not include flange portions 3b, 3c as in the first embodiment. As shown in FIG. 3, the head-seating portion 15c of the bolt 15 protrudes toward the front of the vehicle beyond the front side 4a of the resin case 4. Therefore, any collision energy created from a frontward collision of the vehicle is absorbed by deformation of the head-seating portion 15c of the bolt 15 to prevent the resin case 4 from breaking. Additionally, it should be appreciated that the cross-sectional shape or profile of the head-seating portion 15c of the bolt 15 is circular. This circular shape has a dispersion effect, similar to the bushing 3 described with reference to the first embodiment. The head-seating portion 15c disperses collision energy coming from the front of the electrical circuit device 11 towards the outer sides of the electrical circuit device 21, thereby effectively preventing the resin case 4 from breaking during a collision.

Figure 4:
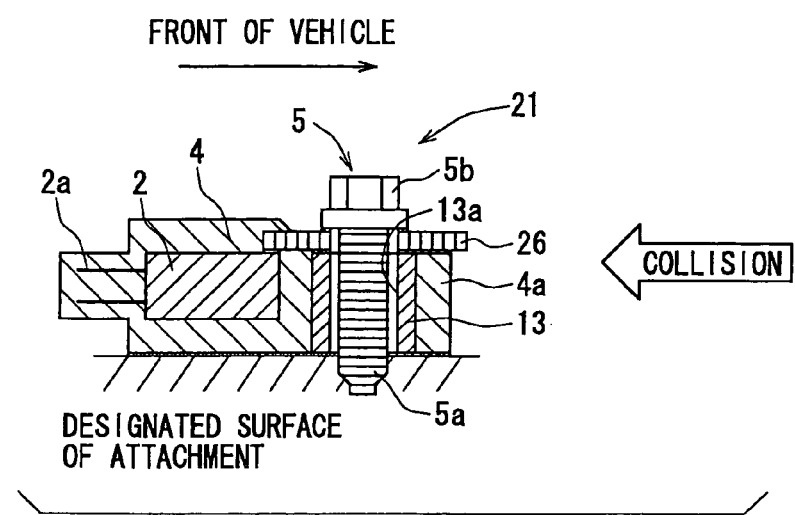
FIG. 4 is a cross-sectional side view of an electrical circuit device according to a third embodiment of the present invention.
Figure 5:
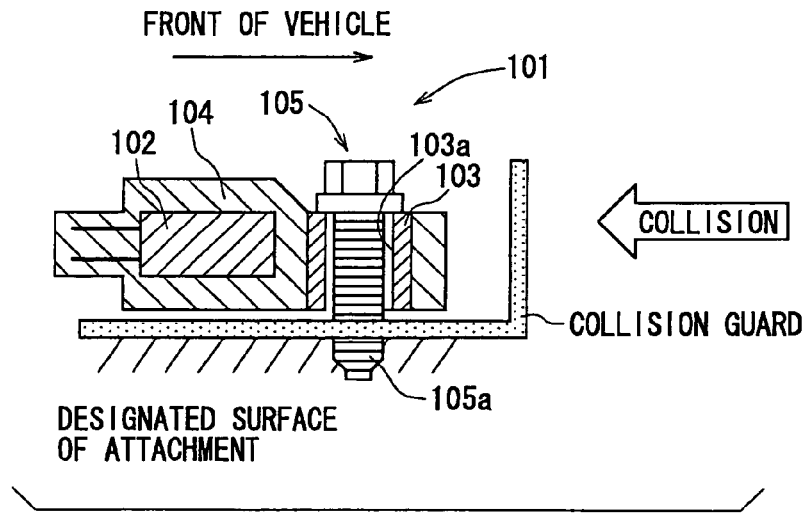
FIG. 5 is a cross-sectional side view of a conventional electrical circuit device.

Next, an electrical circuit device 21 according to a third embodiment of the present invention is described with reference to FIG. 4. The electrical circuit device 21 in this embodiment includes a washer 26 in between the head 5b of the bolt 5 and the resin case 4. In this embodiment, the washer 26 serves as the collision protection rigid body. The bushing 13 and the bolt 5 described in the second and first embodiments, respectively, are also used in this embodiment. The diameter of the washer 26 is large enough compared to the head 5b of the bolt 5 that it protrudes toward the front of the vehicle beyond the front side 4a of the resin case 4. Therefore, the energy of a forward collision is absorbed by deformation or displacement of the washer 26 and, thus, the resin case 4 is protected from breaking. Additionally, it should be appreciated that a cross-sectional shape or profile of the washer 26 is circular and, therefore, has a dispersion effect similar to the bushing 3 of the first embodiment and the head seating portion 15c of the second embodiment. The washer 26 disperses collision energy coming from the front of the vehicle towards the outer sides of the electrical circuit device 21, thereby effectively preventing the resin case 4 from breaking during a collision.

It should be appreciated that the present invention is not limited to the above embodiments and can be modified variably without departing from the scope of the invention.

For example, while each of the above embodiments describes the present invention as being applied to an electrical circuit device used for frontal collision detection, it can also be applied to an electrical circuit device used for lateral collision detection, rearward collision detection, or any other type of collision protection device. Furthermore, the present invention may be applied to various kinds of the electrical circuit devices that are used in collision-prone environments where protection for the electrical circuit device is required.

While the embodiments described above include circular cross-sectional shaped bushing flange portions 3b, 3c, head-seating portion 15c, and washer 26, those parts can be, at least on the collision-prone side, shaped as an arc or a polygon to disperse the energy of a collision towards the outside of the electrical circuit device 1, 11, or 21.

Additionally, it should be appreciated that the present invention may be applied to a variety of electrical circuit devices including an electrical circuit device for an onboard collision detector that is used in a collision-prone environment or any other type of device requiring similar protection.

What is claimed is:

1. A protective structure of an electrical circuit device attached to a vehicle, comprising:
   a resin case;
   an electrical circuit contained in the resin case; and
   a bushing disposed in the resin case and having a protruding portion that protrudes toward a collision-prone side of the vehicle for absorbing collision energy when the vehicle is involved in a collision on the collision-prone side,
   wherein the bushing is made of a metal, and is disposed in the resin case to receive a fastening bolt; and
   at least a portion of the protruding portion protrudes toward the collision-prone side of the vehicle beyond the resin case.

2. The protective structure of claim 1, wherein the protruding portion includes a flange extending radially from the bushing.

3. The protective structure of claim 1, wherein the bushing has a profile of at least one of an arc shape and a polygonal shape on a s facing the collision-prone side of the vehicle.

4. The protective structure of claim 1, wherein the electrical circuit includes a collision-detection sensor.

5. The protective structure of claim 1, wherein the bushing includes a bolt and the protruding portion is a head-seating portion of the bolt.

6. The protective structure of claim 1, wherein the bushing includes a bolt and the protruding portion includes a washer disposed between the bolt and the resin case.

7. The protective structure according to claim 1, wherein the protruding portion protrudes toward the collision-prone side of the vehicle in a round shape.

8. The protective structure according to claim 1, further comprising a mounting surface on a side of the protective structure, and the portion of the protruding portion extends beyond the resin case on another side of the protective structure.

9. The protective structure according to claim 8, wherein the mounting surface comprises a hole for accommodating the fastening bolt through.

10. The protective structure according to claim 1, wherein the portion of the protruding portion extends beyond the resin case on a front side of the protective structure and the electrical circuit is housed within the protective structure toward an opposite rear side of the protective structure relative to the bushing.

11. A protective structure, comprising:
    a resin case;
    an electrical circuit contained in the resin case; and
    a bolt having a protruding portion, for fastening the resin case to a relatively stationary object, wherein at least a portion of the protruding portion protrudes toward a collision-prone side of the relatively stationary object beyond the resin case,
    wherein the bolt is made of metal, and the portion of the portion of the bolt is positioned at the collision-prone side relative to the resin case.

12. The protective structure of claim 11, wherein the protruding portion of the bolt includes a head-seating portion.

13. The protective structure of claim 11, wherein the electrical circuit includes a collision-detection sensor.

14. The protective structure of claim 11, wherein the head-seating portion includes a profile of at least one of an arc shape and a polygonal shape on a side facing the collision-prone side of the vehicle.

15. The protective structure according to claim 11, wherein the protruding portion protrudes toward the collision-prone side of the vehicle in a round shape.

16. The protective structure according to claim 11, further comprising a mounting surface on a side of the protective structure that the bolt extends through, and the portion of the protruding portion extends beyond the resin case on another side of the protective structure.

17. The protective structure according to claim 11, wherein the portion of the protruding portion extends beyond the resin case on a front side of the protective structure and the electrical circuit is housed within the protective structure toward an opposite rear side of the protective structure relative to the bolt.

* * * * *